United States Patent [19]
Wakayama et al.

[11] Patent Number: 5,920,869
[45] Date of Patent: Jul. 6, 1999

[54] DATABASE MANAGEMENT SYSTEM

[75] Inventors: Satoshi Wakayama, Sakai; Toshiaki Shimoi, Osaka; Susumu Kobayashi, Yokohama; Hideo Munechika, Kobe, all of Japan

[73] Assignees: Hitachi, Ltd., Tokyo; Hitachi Software Engineering Co., Ltd., Yokohama, both of Japan

[21] Appl. No.: 08/728,379

[22] Filed: Oct. 9, 1996

[30] Foreign Application Priority Data

Oct. 12, 1995 [JP] Japan .................................. 7-264421

[51] Int. Cl.⁶ .................................................. G60F 17/30
[52] U.S. Cl. .............................. 707/103; 707/1; 707/100; 707/10; 707/104
[58] Field of Search ................................ 707/103, 14, 24, 707/10, 104, 1, 100; 395/500; 463/64

[56] References Cited

U.S. PATENT DOCUMENTS

| | | | |
|---|---|---|---|
| 5,437,025 | 7/1995 | Bale | 707/101 |
| 5,448,727 | 9/1995 | Annevelink | 707/101 |
| 5,485,626 | 1/1996 | Lawlor | 395/683 |
| 5,509,123 | 4/1996 | Dobbins | 395/200.73 |
| 5,560,005 | 9/1996 | Hoover | 707/10 |

OTHER PUBLICATIONS

"Transaction Processing: Concepts and Techniques", Jim Gray et al, Morgan Kaufmann Publishers, 1993, pp. 760–768.

*Primary Examiner*—Thomas G. Black
*Assistant Examiner*—Diane D. Mizrahi
*Attorney, Agent, or Firm*—Fay, Sharpe, Beall, Fagan, Minnich & McKee

[57] ABSTRACT

In an object-oriented database management system, a storage area of each data object is controlled using information indicating a storage area position of the data object in the database and a management serial number of the storage area. Each data object is provided with a directory object to keep therein information indicating a storage area position of the associated data object in the database and a management serial number of the storage area. In the database, the storage area of each data object is controlled using information denoting the storage area position in the corresponding directory object and the management serial number of the directory object.

8 Claims, 11 Drawing Sheets

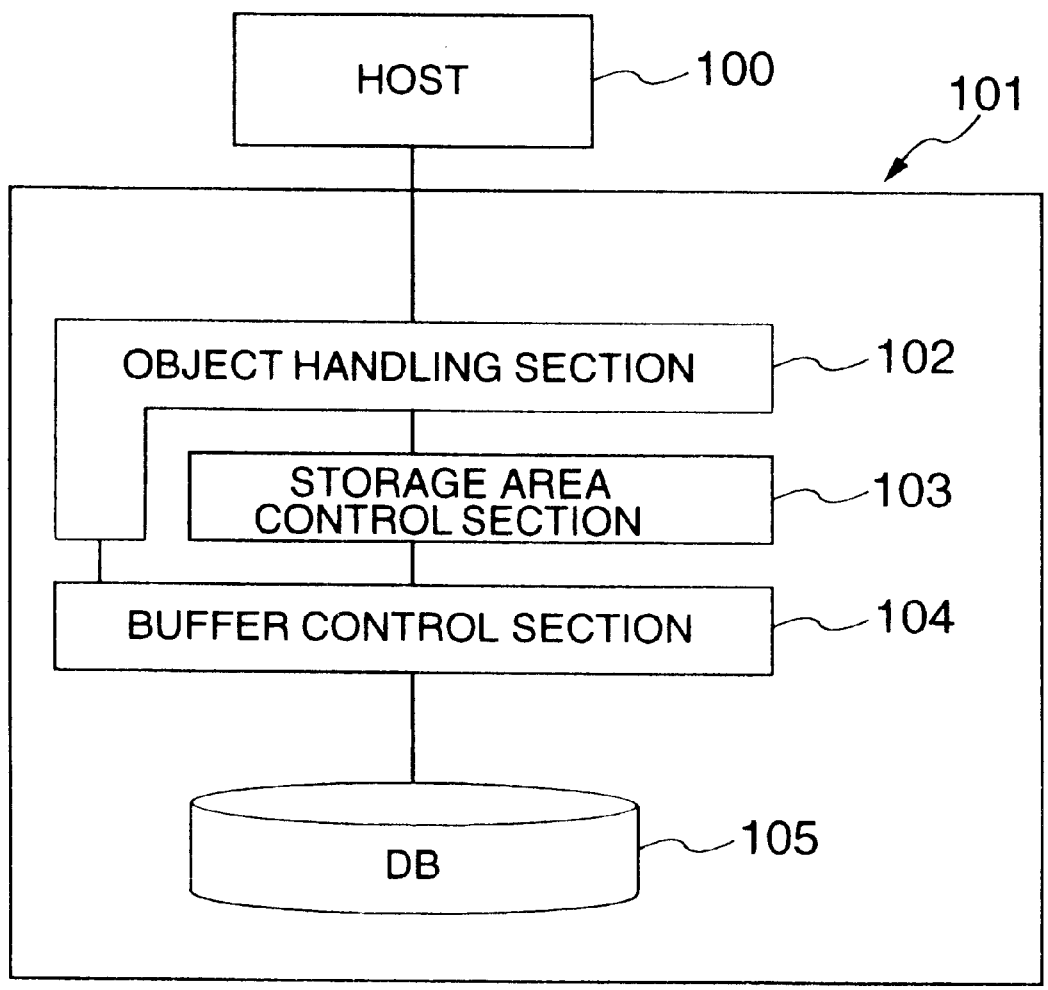

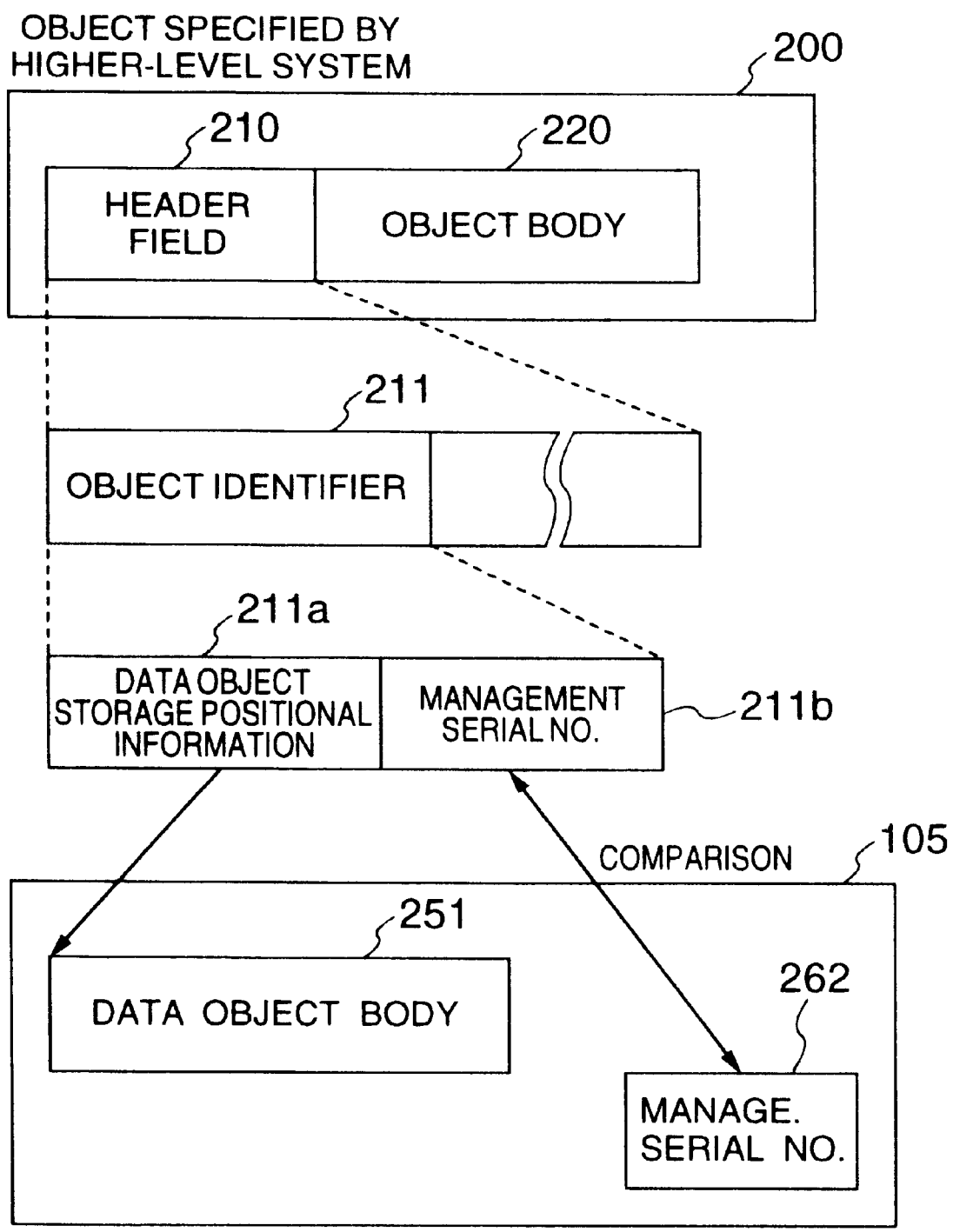

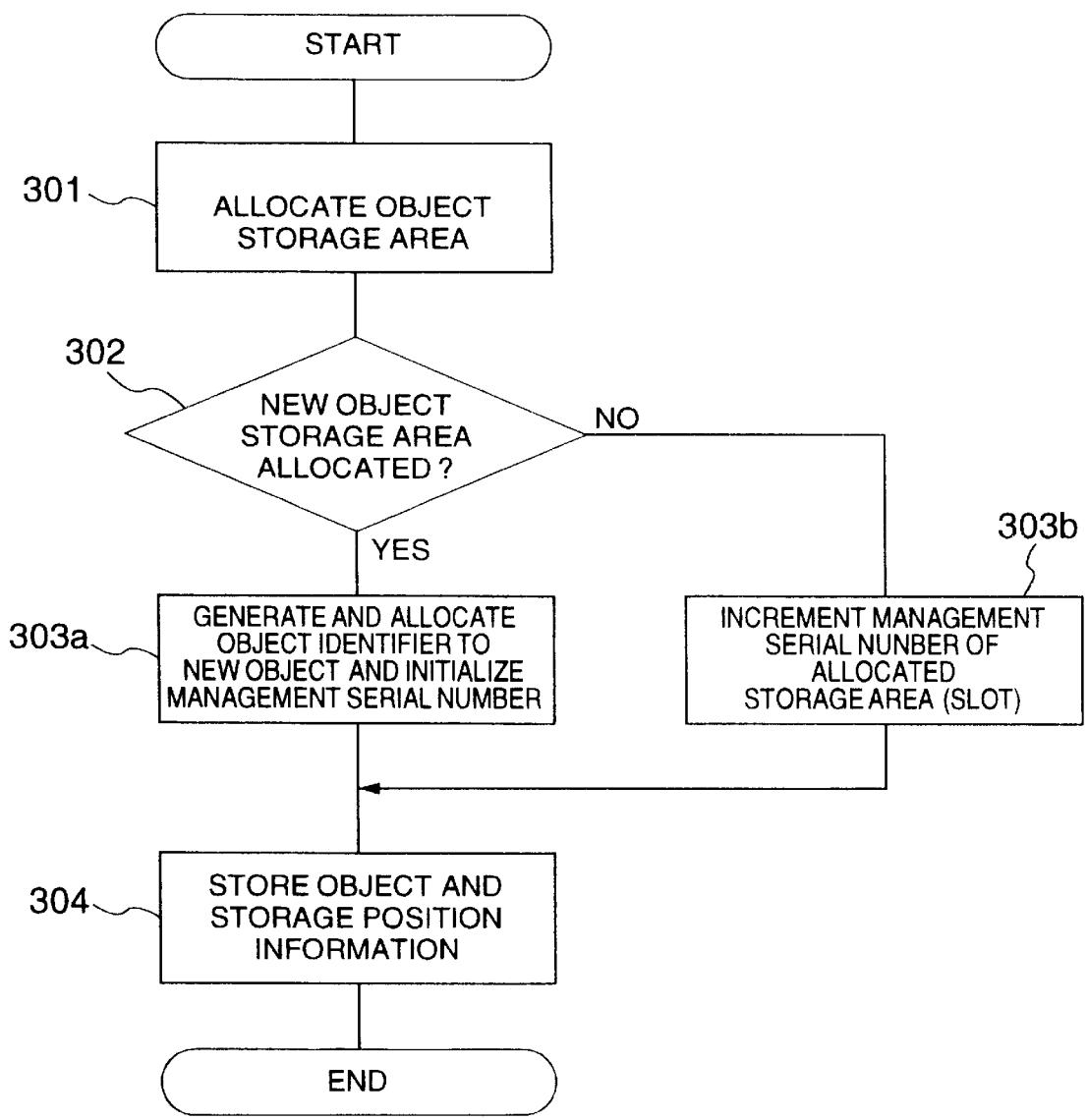

DATABASE MANAGEMENT SYSTEM

BACKGROUND THE INVENTION

The present invention relates to a database management system, and in particular, to an object-oriented database management system employing an object identifier to increase the data access speed of the database.

As described on pages 760 to 768 of the "Transaction Processing: Concepts And Techniques" written by Jim Gray and Andreas Reuter and published from Morgan Kaufmann Publishers in 1993, there have been heretofore known two object management methods in the database management systems. In the first method, storage position information of each object is adopted as an object identifier for the object management, and in the second method, a generation serial number of each object is utilized as an object identifier, and there is provided a translation table for relating each object identifier to an object storage information item to manage the objects.

According to the first method of the database management system, there arises a problem for the preservation of uniqueness, integrity, and perpetuity of each object identifier thus generated. Namely, the user cannot store a new object at a storage area in which the preceding object has already been deleted unless the user re-arranges the objects in the database and changes the contents of pointers pointing to those objects. In other words, the storage position of an object once stored to the database cannot be altered unless the user changes the contents of pointers pointing to the object.

On the other hand, according to the second object management method, the translation table is implemented employing an index system in which the object identifier is set as an index key. Consequently, in the generation and/or deletion of the object or in the handling of the object using an object identifier, there occurs overhead time in various processing operations such as retrieval and update of the index above. This results in a problem of deterioration in the processing performance of the database management system.

SUMMARY OF THE INVENTION

It is therefore an object of the present invention to provide a database management system in which the overhead taking place in association with the object handling process is minimized, the storage position of the deleted object is used again, and the storage area allocation of the object registered is easily changed at a high speed, thereby solving the problem above.

To achieve the object, in the first configuration example of the database management system according to the present invention, each object of an object-oriented database management system is controlled using storage position information of the object in the database and a management serial number of the storage position (these items are collectively called as an object identifier herebelow). When a storage position which was used before and which is currently available is desired to be employed as a storage position of a new object, the database management system need only change (for example, increment) the management serial number of the pertinent storage area position. This makes it possible to discriminate the new object from the old object once stored at the storage area position.

Owing to the first configuration, the object can be accessed at a high speed according to the storage position information in the object identifier. Namely, the creation and/or deletion of each object as well as the acquisition of the contents of the object can be accomplished at a high speed, thereby remarkably reducing the overhead time associated with the object handling process. Additionally, even when the new object is stored at the storage position in which the old object was deleted, the uniqueness of the contents of the object identifier can be guaranteed by using the management serial number in the object identifier.

Furthermore, in the second configuration example of the database management system according to the present invention, there is provided a directory object for each object in an object-oriented database management system such that the directory object includes information of the storage area position of the associated object in the database and a control or management sequential number of the object directory. These items are collectively referred to as an object identifier. When a directory object which was once used for an old object and which is currently available is to be adopted as a directory object of a new object, the new object can be discriminated from the old object related to the pertinent directory object in the past only by altering (e.g., incrementing) the management serial number of the directory object.

Owing to the second configuration, in addition to the minimization of overhead time and the guaranteeing of uniqueness of the contents of the object identifier, there can be attained an advantage that the storage area allocation or layout of the (data) objects once registered can be easily varied at a high speed only by updating the registered contents of the directory object.

BRIEF DESCRIPTION OF THE DRAWINGS

These and other objects and advantages of the present invention will become apparent by reference to the following description and accompanying drawings wherein:

FIG. 1 is a block diagram showing the basic configuration of the operating environment required for operation of the database management system according to the present invention;

FIGS. 2A to 2D are conceptual diagrams showing relationships between objects and object identifiers used in the first embodiment of the database management system according to the present invention;

FIG. 3 is a flowchart conceptually showing a processing flow to register a new object in the first embodiment of the database management system according to the present invention;

DESCRIPTION OF THE PREFERRED EMBODIMENTS

Figure 2B:
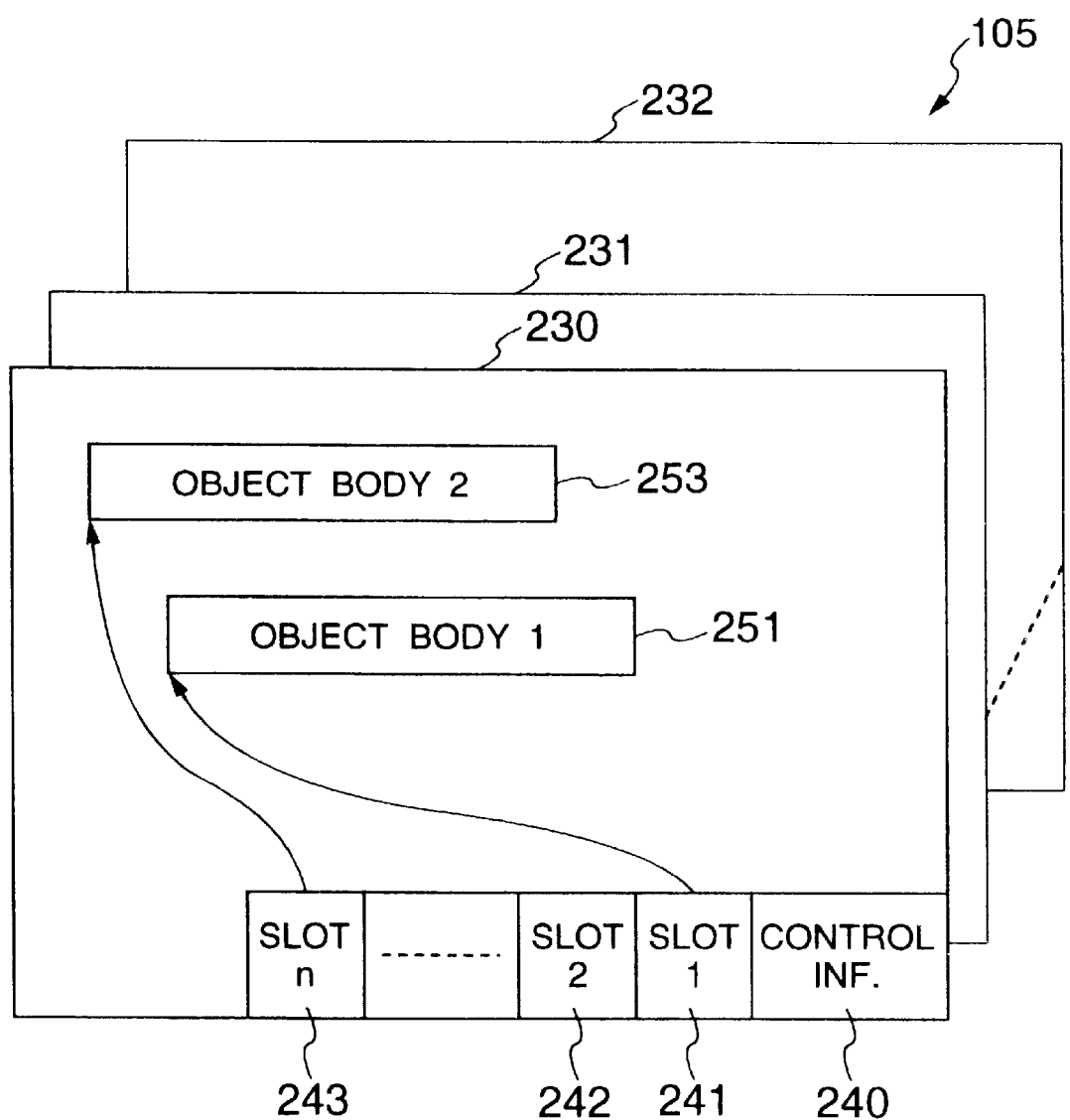

Referring now to the accompanying drawings, description will be given of embodiments of the database management system according to the present invention.

FIG. 1 is a block diagram showing the fundamental structure of the operational environment necessary for operation of the database management system according to the present invention. In the diagram, an object storage control or management section 101 includes an object handling section 102, a storage area control or management section 103, a buffer control section 104, and a database 105. The object handler 102 receives an operation request issued for an object from a higher-level system (host) 100 relative to the object storage controller 101 and accordingly conducts generation, deletion, acquisition, and/or update of the object. The storage area controller 103 manages the object storage area in the database 105 to allocate or to release an object storage area according to a request from the object handler 102. The buffer controller 104 accesses the database 105 to read the contents of an object therefrom into a buffer or to write the contents of an object into the database 105 from the buffer so as to register or update the object. Stored in the database 105 are object area control information and objects to be handled.

FIG. 2A conceptually shows relationships between objects and object identifiers utilized in the first embodiment of the database management system according to the present invention. In FIG. 2A, an object 200 including a header field 210 in which various information items unique to the object are stored and an object body 220 storing therein the contents of the object is specified at an operation request issued from the higher-level system to the object controller 101. An object identifier 211 is used to discriminate the associated data object body 205 from the other objects registered to the database 105. The identifier 211 includes storage position information 211a to directly obtain the data object body 251 and a management serial number 211b for the object body 251, the serial number 211b being an advantageous feature of the present invention.

The management serial number 211b in the object identifier 211 specified by the higher-level system is compared with a management serial number 262 corresponding to the storage area position of the data object body 251 in the database 105. When these numbers match each other, the data object 251 is regarded as the target object and then the object handler 102 executes an operation requested by the higher-level system 100 for the data object 251.

FIG. 2B shows an example of the object layout to store objects in the database 105. In the diagram, the database 105 is subdivided into a plurality of pages 230 to 232. The storage areas of object bodies (e.g., object bodies 251 and 253) stored in each page (e.g., page 230) are managed according to information items in the slots disposed for the respective objects. In this connection, a field 240 is provided to store therein control information items such as the number of slots in the page and the number of slots in use.

Figure 2C:
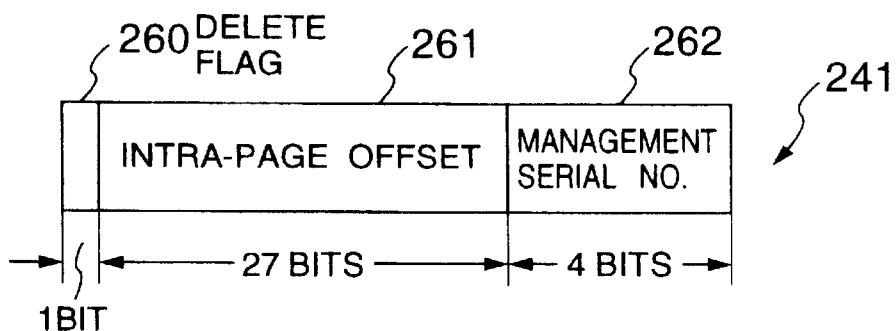

Each slot includes various information items. For example, FIG. 2C shows information items of the slot 241. In FIG. 2C, the slot 241 includes, for example, a one-bit delete flag 260, a 27-bit intra-page offset 261 of object body 251, and a 4-bit current management serial number 262 of the storage area related to the object body 251.

Figure 2D:
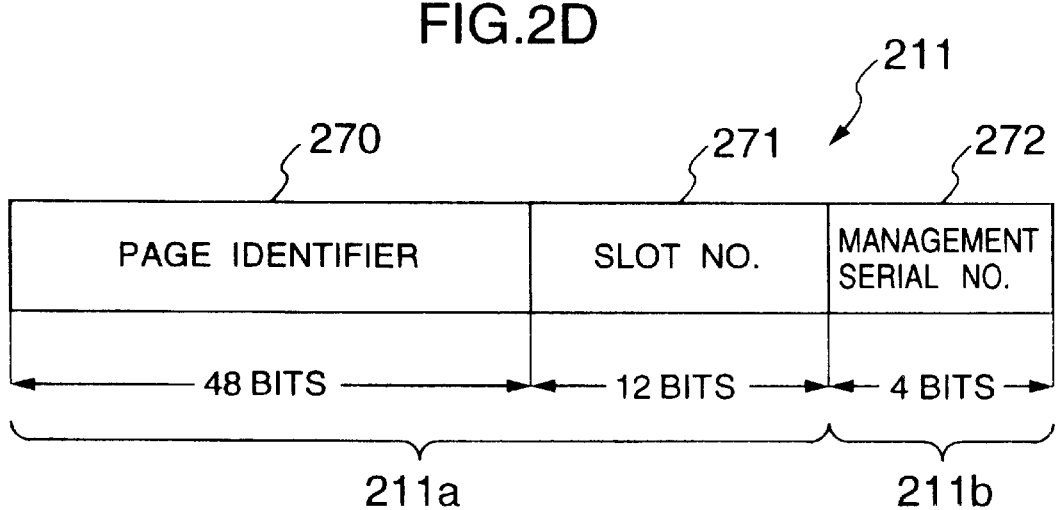

On the other hand, FIG. 2D shows an example of an object identifier issued from the higher-level system to specify an object. In this diagram, an object identifier 211 includes storage position information 211a and a management serial number 211b. The information 211a includes a 48-bit page identifier 270 specifying a page in which the requested object is stored and a 12-bit slot number 271.

FIG. 3 is a flowchart schematically showing a processing flow to register a new object in the first embodiment of the database management system according to the present invention. In this flowchart, when the higher-level system issues an instruction of generating a new object, the storage controller 103 of FIG. 1 first refers to the object storage management information to allocate an area of the database 105 in which the object 200 is to be stored (step 301). When a new object storage area is determined to be assigned (step 302=Yes), the controller 103 generates and assigns an object identifier 211 to the new object (i.e., actually allocates a slot shown in FIG. 2B). Thereafter, the controller 103 initializes the management serial number 211b of the pertinent object (step 303a).

On the other hand, when an existing object storage area (slot) is to be used again (step 302=No), the controller 103 increments the management serial number 262 of the object storage area (slot; step 303b). After the process of step 303a or 303b, the object handler 102 stores the associated object body 251 in the database 105 of FIG. 1 and the storage area controller 103 stores the created object identifier (including the storage position information and management serial number) in the database (slot; step 304). Incidentally, the established object identifier is then sent from the object handler 102 to the higher-level system 100.

Figure 4:
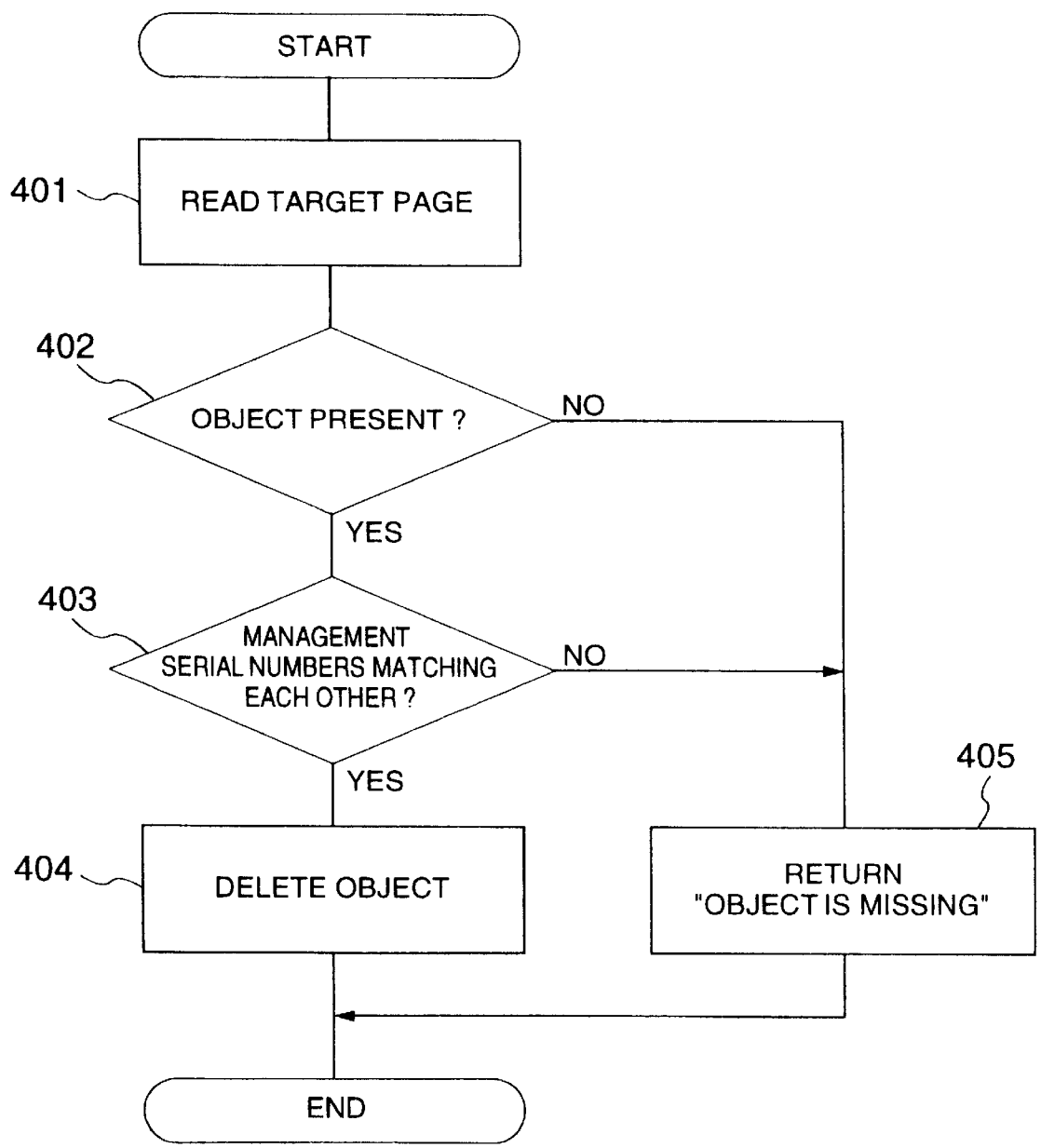
FIG. 4 is a flowchart conceptually showing a processing flow to delete an existing object in the first embodiment of the database management system according to the present invention.

FIG. 4 is a flowchart conceptually showing a processing flow to delete an existing object in the first embodiment of the database management system according to the present invention. In FIG. 4, the contents of the page 230 corresponding to the specified object 200 are moved to a buffer (step 401). According to the obtained contents, when the delete flag 260 of the slot 241 associated with the specified object is OFF (namely, indicating the non-deleted state (step 402=Yes) and the value of the management serial number 262 of the slot 241 matches that of the management serial number contained in the header field 210 of the specified object 200 (step 403=Yes), the object handler 102 sets the delete flag 260 of the slot 241 to ON indicating that the object is deleted and then the storage area controller 103 updates the object storage area management information. As a result, the specified object is deleted (step 404).

In contrast thereto, when the delete flag 260 of the slot 241 read in step 401 is ON (namely, indicating the deleted state) (step 402=No) or the value of the management serial number 262 of the slot 241 is different from that of the management serial number in the header field 210 (step 403=No), the object handler 102 returns a message "Object is missing" to the higher-level system 100 (step 405).

In this regard, the flowchart of FIG. 4 is similarly applicable to the update of the object if the object body is updated in the step 404 of FIG. 4.

Figure 5:
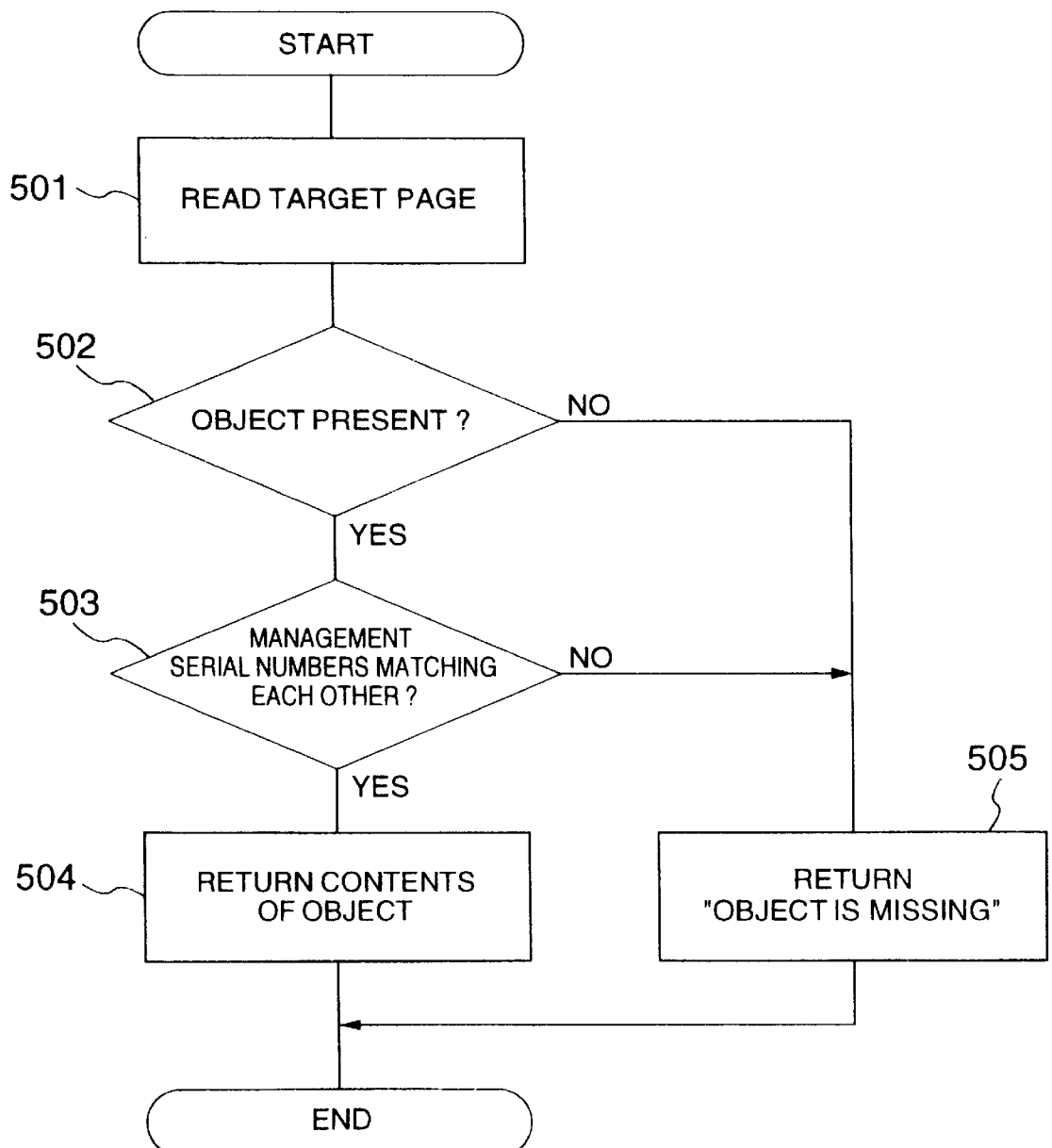
FIG. 5 is a flowchart conceptually showing a processing flow to attain an existing object in the first embodiment of the database management system according to the present invention.

FIG. 5 is a flowchart schematically showing a processing flow to acquire or to get an existing object in the first embodiment of the database management system according to the present invention. In the flowchart, the contents of the page 230 related to the specified object identifier 211 are first moved to a buffer (step 501). According to the obtained contents, when the delete flag 260 of the slot 241 corresponding to the specified object is OFF, namely, indicating the non-deleted state (step 502=Yes) and the value of the management serial number 262 of the slot 241 matches that of the management serial number in the specified object identifier (step 503=Yes), the object handler 102 obtains the object body 220 and then sends the contents thereof to the higher-level system (step 504).

In contrast thereto, when the delete flag 260 of the slot 241 attained in step 401 is ON, namely, indicating the deleted state (step 502=No) or the value of the management serial number 262 of the slot 241 is other than that of the management serial number in the specified object identifier (step 503=No), the object handler 102 returns a code indicating that the specified object is missing to the higher-level system 100 (step 505).

Figure 6:
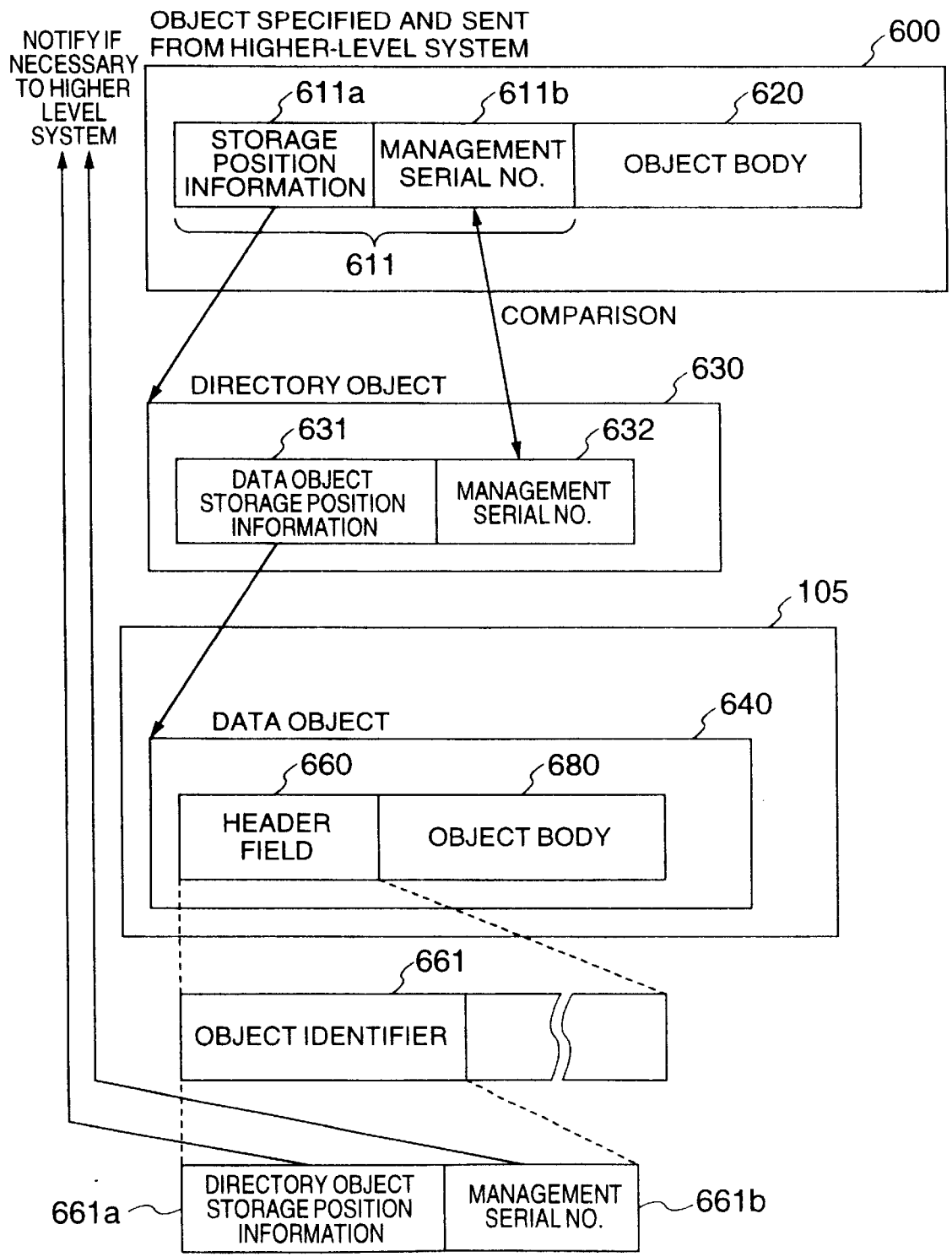
FIG. 6 is a conceptual diagram showing relationships between data objects, directory objects, and object identifiers adopted in the second embodiment of the database management system according to the present invention.

FIG. 6 is a schematic diagram showing relationships between the data objects, directory objects, and object identifiers employed in the second embodiment of the database management system according to the present invention. In this connection, the directory object is arranged in the database 105 or the storage area controller 103. In FIG. 6, a data object 640 includes a header field 660 in which various information items unique to the object are stored and an object body 680 including the contents of the object.

The header 660 to be stored in the database 105 together with the object body 680 includes an object identifier 661 for the following reason. When a data object 640 is attained directly from the database by achieving a retrieval operation therethrough, the object identifier and the directory object 630 associated with the data object 640 can be recognized. The identifier 661 includes storage position information 661a of the directory object 630 which has been registered together with the data object 640 and a management serial number 611b of the directory object 630. In addition, the directory object 630 includes storage position information 631 of the data object 640, which makes it possible to directly obtain the data object, and a management serial number 632 of the directory object 630.

Figure 7:
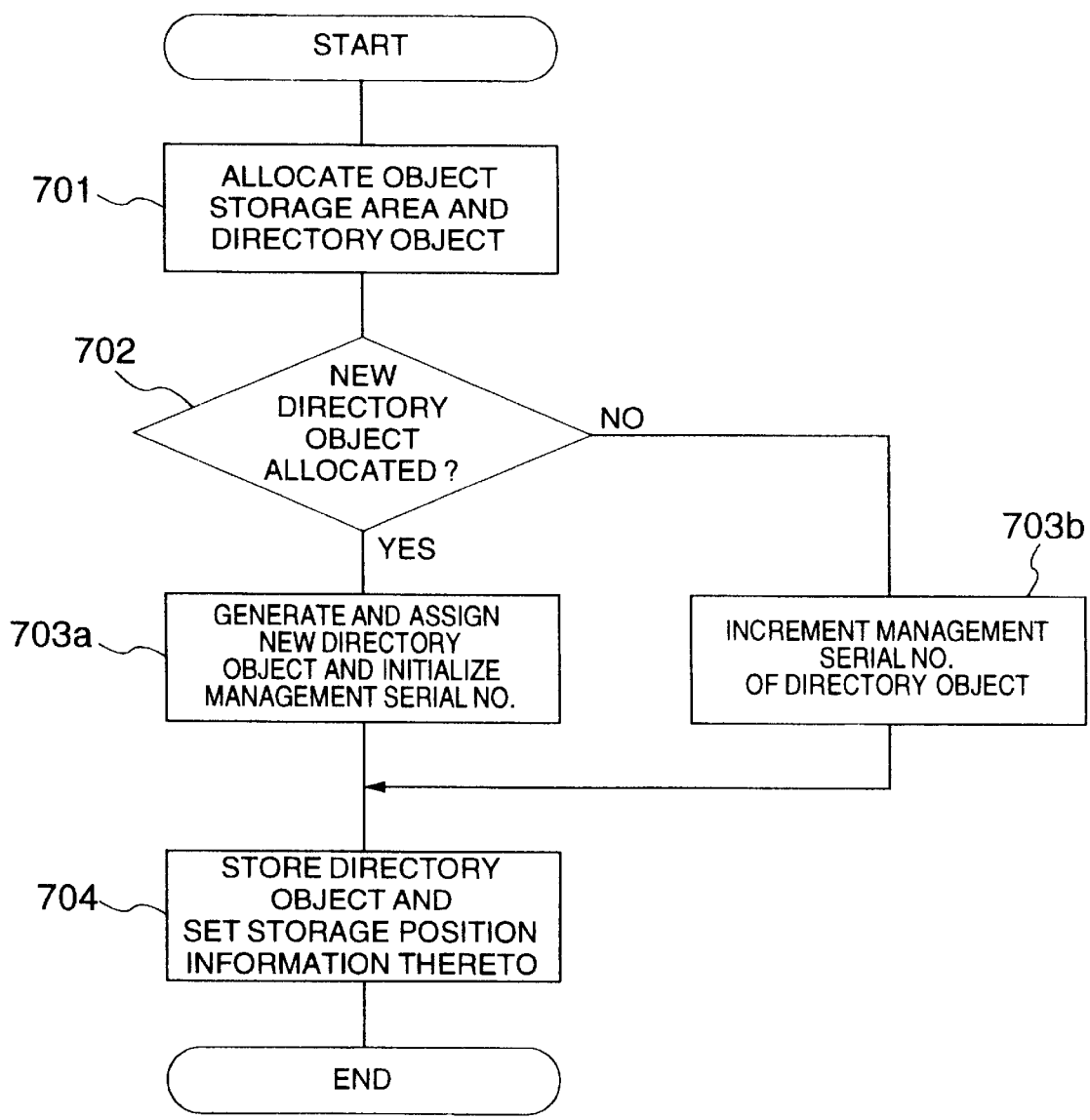
FIG. 7 is a flowchart conceptually showing a processing flow to register a new object in the second embodiment of the database management system according to the present invention.

FIG. 7 is a flowchart schematically showing a processing flow of registering a new object in the second embodiment of the database management system according to the present invention. On receiving an instruction from the higher-level system 100 to generate a new object, the storage area controller 103 of FIG. 1 first refers to the object storage area control information to allocate a storage area of the database 105 in which the new object (data object) 600 is to be stored and then assigns a directory object 630 (step 701). Thereafter, when the directory object to be assigned 630 is a new directory object (step 702=Yes), the controller 103 generates and assigns the new directory object 630 and then initializes the management serial number 632 of the directory object 630 (step 703a).

On the other hand, when the assigned directory object 630 is existing (step 702=No), the controller 103 increments the management serial number 632 of the directory object 630 (step 703b). After the processes of steps 703a and 703b, the object handler 102 stores the pertinent data object body 620 as the data object body 680 in the database 105 and the storage area controller 103 sets the storage area position of the data object 640 to the storage position information 631 in the directory object 630, thereby updating the object storage area control information (step 704). Incidentally, the object identifier 661 of the stored data object 640 is notified from the object handler 102 to the higher-level system 100.

Figure 8:
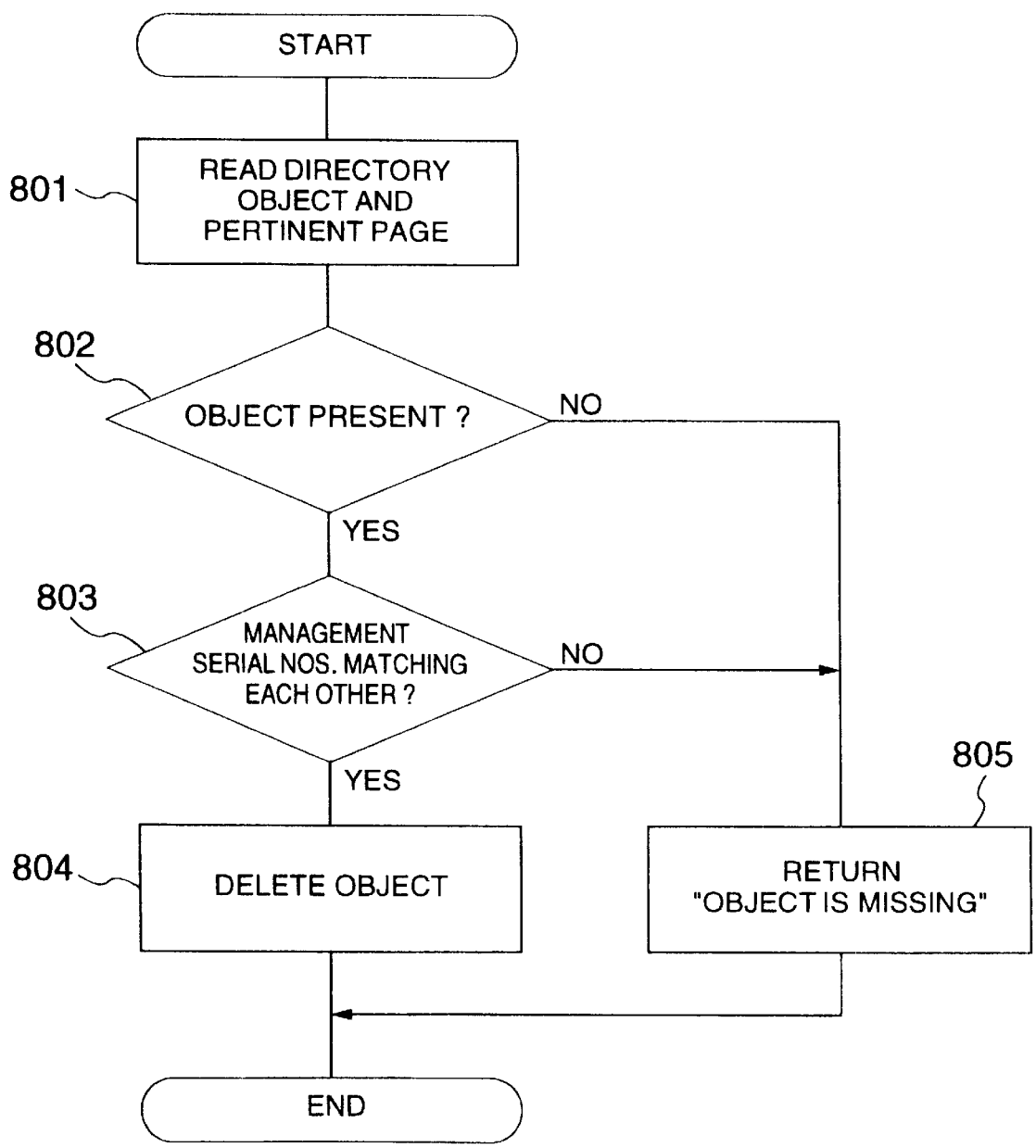
FIG. 8 is a flowchart conceptually showing a processing flow to delete an existing object in the second embodiment of the database management system according to the present invention.

FIG. 8 is a flowchart conceptually showing a processing flow of deleting an existing object in the second embodiment of the database management system according to the present invention. First, according to the object identifier 611 corresponding to the specified data object 600, the contents of the directory object 630 specified by the directory object storage position information 611a are moved to a buffer. Using the storage position information 631 of the data object in the obtained directory object 630, an access operation is conducted to obtain a page 230 containing the specified object through a read operation (step 801). When the directory object 630 thus read is available or not vacant (step 802=Yes) and the management serial number 632 of the directory object 630 matches that of the management serial number 611b of the object identifier (step 803=Yes), the object handler 102 sets the value of deleted state to the slot 241 of the page 230 and the storage controller 103 releases the corresponding directory object and updates the object storage area management information so as to resultantly delete the specified data object 640 (step 804).

On the other hand, when the directory object 630 thus read is not available or vacant (step 802=No) or the management serial number 632 of the directory object 630 is different from that of the management serial number 611b of the object identifier of the specified object (step 803=No), the object handler 102 sends a code designating a message "Specified object is missing" to the higher-level system 100 (step 805).

Figure 9:
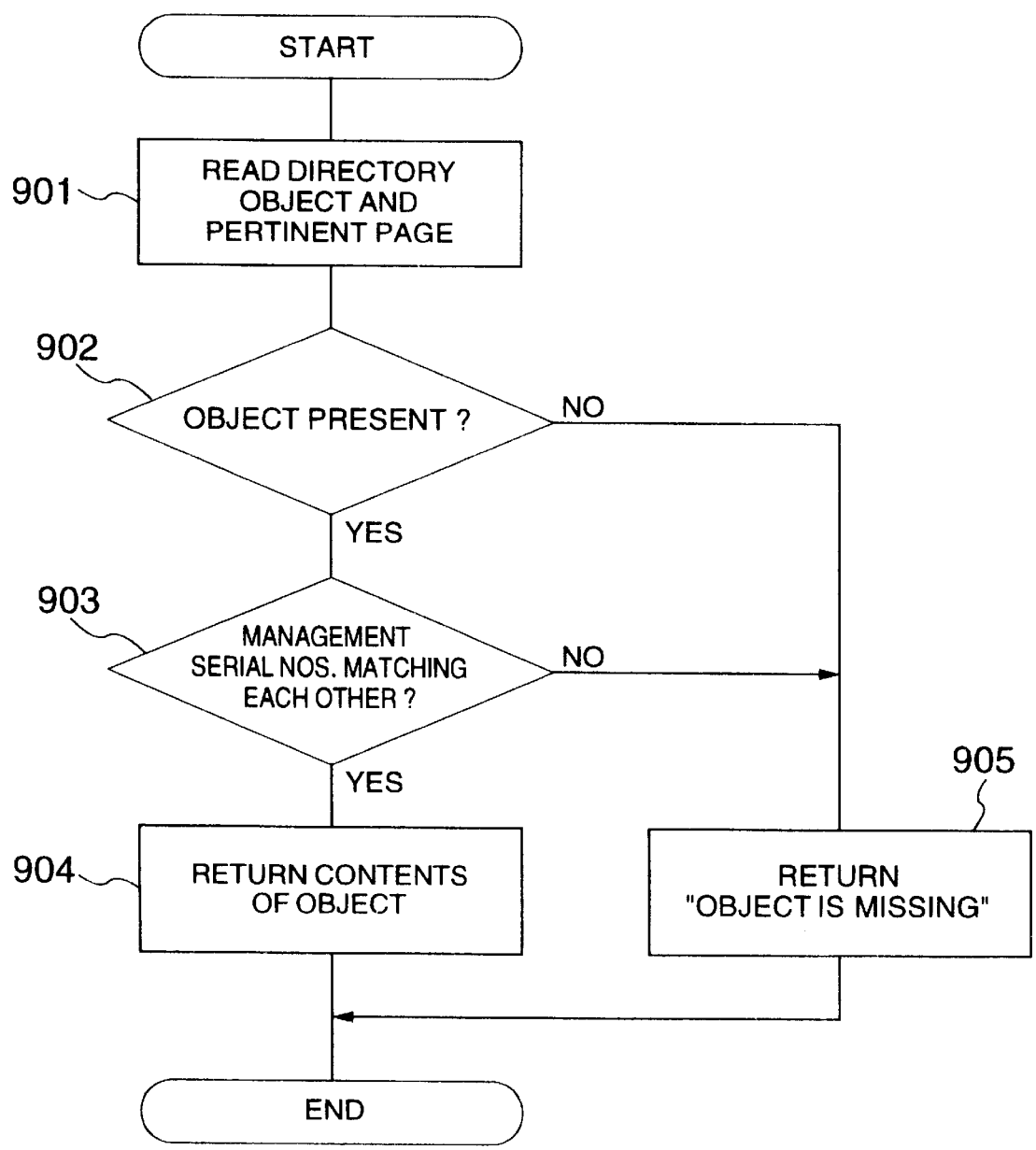
FIG. 9 is a flowchart conceptually showing a processing flow to attain an existing object in the second embodiment of the database management system according to the present invention.

FIG. 9 is a schematic flowchart showing a processing flow of acquiring or getting an existing object in the second embodiment of the database management system according to the present invention. First, according to the specified object identifier, the contents of the directory object 630 specified by the directory object storage position information 611a are moved to a buffer. Using the storage position information 631 of the data object in the obtained directory object 630, an access operation is conducted to read a page 230 containing the specified data object (step 901). When the directory object 630 thus read is available or not vacant (step 902=Yes) and the management serial number 632 of the directory object 630 matches that of the management serial number 611b of the object identifier (step 903=Yes), the object handler 102 obtains the specified object and sends the contents thereof to the higher-level system 100 (step 904).

On the other hand, when the directory object 630 thus read is not available or vacant (step 902=No) or the management serial number 632 of the directory object 630 is other than that of the management serial number 611b of the specified object identifier (step 903=No), the object handler 102 supplies the higher-level system 100 with a code notifying a message "Specified object is missing" (step 905).

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A database management system, comprising an object control section including:

a database for storing therein a plurality of data objects;

an object handling section for processing data objects in said database; and a storage area control section for controlling storage areas of data objects in said database according to requests from said object handling section, wherein said storage area control section controls each of said data objects using a corresponding object identifier constituted by a management serial number and information representing a storage area position thereof in said database, and wherein said management serial number is a variable number for reuse of a storage area of a data object stored in said database for each of said storage areas.

2. A database management system according to claim 1, wherein when a storage area previously used for an old data object is desired to be utilized as a storage area of a new data object, said storage area control section changes a current management serial number of the storage area thus desired.

3. A database management system according to claim 2, wherein on receiving a request of an operation of a data object with specifications of an object identifier thereof from a request source, said object control section returns to said request source, when a management serial number of the specified object identifier is other than the current management serial number of a storage area designated by a storage area position of the specified object identifier, a message that the pertinent data object is missing.

4. A database management system according to claim 1, wherein slots are arranged for respective data objects on a page in said database, each of the slots keeping therein a corresponding object identifier.

5. A database management system according to claim 4, wherein each of the slots further keeps therein a delete flag indicating whether or not the associated data object is in a deleted state.

6. A database management system, comprising an object control section including:

a database for storing therein a plurality of data objects;

an object handling section for processing data objects in said database; and a storage area control section for controlling storages areas of the data objects in said database according to requests from said object handling section, wherein each of said data objects is provided with a directory object, each of said directory objects keeping therein an object identifier constituted by a current management serial number and information representing a storage area position of the corresponding data object in said database, wherein said management serial number is a variable number for reuse of a directory object; and wherein said storage area control section controls each of the data objects using a corresponding object identifier.

7. A database management system according to claim 6, wherein when a directory object previously used is desired to be utilized as a directory object of a new data object, said storage area control section changes the current management serial number of the directory object thus desired.

8. A data base management system according to claim 7, wherein on receiving a request of an operation of a data object with specification of an object identifier thereof from a request source, said object control section returns to the request source, when the management serial number of the specified object identifier is other than the current management serial number of a directory object corresponding to a data object position of the specified object identifier, a message that the pertinent data object is missing.

* * * * *